(12) United States Patent
Tang et al.

(10) Patent No.: US 12,264,278 B2
(45) Date of Patent: Apr. 1, 2025

(54) ULTRA-LOW TEMPERATURE PHASE CHANGE GEL

(71) Applicant: Pregis New Materials (Shenzhen) CO., LTD., Shenzhen (CN)

(72) Inventors: Tao Tang, Shenzhen (CN); Xiaoshan Fan, Shenzhen (CN)

(73) Assignee: Pregis New Materials (Shenzhen) CO., LTD., Shenzhen (CN)

( * ) Notice: Subject to any disclaimer, the term of this patent is extended or adjusted under 35 U.S.C. 154(b) by 467 days.

(21) Appl. No.: 17/658,724

(22) Filed: Apr. 11, 2022

(65) Prior Publication Data
US 2023/0028657 A1 Jan. 26, 2023

(30) Foreign Application Priority Data
Jul. 17, 2021 (CN) .......................... 202110809618.2

(51) Int. Cl.
*C09K 5/06* (2006.01)

(52) U.S. Cl.
CPC .................................. *C09K 5/066* (2013.01)

(58) Field of Classification Search
CPC .......... C09K 5/066; C09K 5/063; C09K 5/14; C09K 3/18
See application file for complete search history.

(56) References Cited

U.S. PATENT DOCUMENTS

| | | | | |
|---|---|---|---|---|
| 5,061,315 | A * | 10/1991 | Collier | C23C 22/34 427/407.1 |
| 11,130,895 | B2 * | 9/2021 | Trifu | C08J 9/286 |
| 2018/0100682 | A1 | 4/2018 | Nilsen et al. | |
| 2020/0231857 | A1 * | 7/2020 | Altay | C08K 3/36 |

FOREIGN PATENT DOCUMENTS

| | | | | | |
|---|---|---|---|---|---|
| CN | 107189765 | A | * | 9/2017 | .............. C09K 5/06 |
| CN | 107722944 | A | * | 2/2018 | .............. C09K 5/06 |
| CN | 111826131 | A | * | 10/2020 | .............. C08J 3/075 |
| CN | 113861943 | A | * | 12/2021 | .............. C09K 5/063 |
| JP | H08218063 | A | * | 8/1996 | .............. C09K 5/06 |
| JP | H10212472 | A | * | 8/1998 | .............. C09K 5/06 |
| JP | 2002173671 | A | * | 6/2002 | .............. C09K 5/06 |
| WO | WO-2007066806 | A1 | * | 6/2007 | .............. A61F 7/106 |
| WO | WO-2019068458 | A1 | * | 4/2019 | .......... B01J 13/0065 |

OTHER PUBLICATIONS

Niedermaier, S., Characterisation and Enhancement of Phase Change Slurries, Energy Procedia 99 (2016) 64-71.
Stefan-Kharicha, M., Review of Ammonium Chloride-Water Solution Properties, J. Chem. Eng. Data 2018, 63, 9, 3170-3183.

* cited by examiner

*Primary Examiner* — Jane L Stanley
(74) *Attorney, Agent, or Firm* — AVEK IP, LLC

(57) ABSTRACT

Some embodiments of the disclosure provide an ultra-low temperature phase change gel including a phase change matrix, a temperature regulator and a nucleating agent. In some embodiments, the phase change matrix is used as a host material for phase change to store and release cooling capacity, the temperature regulator is used for regulating the phase change temperature of the phase change matrix, and the nucleating agent is used for reducing a supercooling degree of the phase change matrix. The phase change matrix includes a temperature control material and water. The temperature control material includes sodium silicate, dipotassium hydrogen phosphate and aluminum sulfate, and the temperature regulator comprises polyethylene glycol. The nucleating agent includes a composite material formed by free radical polymerization of a reaction monomer and a macroinitiator. The composite material includes polyacrylic acid grafted with silica hybrid nano particles.

10 Claims, 9 Drawing Sheets

ULTRA-LOW TEMPERATURE PHASE CHANGE GEL

CROSS REFERENCE TO RELATED APPLICATIONS

This application claims priority to Chinese application number 202110809618.2 filed on Jul. 17, 2021, the disclosure of which is incorporated by reference herein in its entirety.

FIELD OF THE DISCLOSURE

The disclosure relates generally to the field of pharmaceutical cold-chain transportation. More specifically, the disclosure relates an ultra-low temperature phase change gel.

BACKGROUND

With the rapid development of modern logistics and the increasing demands of pharmaceutical cold-chain transportation, more and more attention has been paid to pharmaceutical cold-chain logistics. In the process of medicine cold chain transportation, the transportation temperature and its fluctuation range should be strictly controlled to ensure the storage effect of the transported drugs, vaccines, blood products and other items. The phase change energy storage technology has the advantages of large energy storage density, approximately constant temperature in the phase change process, stable output energy and the like. The phase change energy storage technology coupled with medicine cold chain transportation can realize the effects of constant temperature cold preservation, energy conservation and loss reduction.

The major working medium in phase change energy storage technology system is phase change material, which directly determines the quality of cold chain transportation. Therefore, the development of phase change materials with proper phase change temperature range, high latent heat value, low supercooling degree, no phase separation and good cycle stability has greatly facilitated the development of pharmaceutical cold chain. At present, inorganic hydrated salts and organic phase change materials are often used as medicine cold-chain transportation phase change materials, however, the inorganic hydrated salts have the defects of phase separation, easy leakage and the like, and the organic phase change materials also have the defects of low latent heat, inflammability, and the like. For example, the Chinese patent CN 102746829A discloses an ultra-low temperature energy storage material composition mainly including magnesium chloride, magnesium nitrate and water. The crystallization temperature of the material is about −50° C. so that the ultra-low temperature storage requirements of many products can be met. However, the stability of inorganic energy storage systems is generally not good enough, and severe phase separation may occur after many cycles of heat charging and heat discharging. Furthermore, energy storage materials based on chloride ions or nitrate ions may also have safety issues, such as corrosion of chloride ions. In addition, crystallization temperatures around −50° C. still fail to meet lower temperature transport requirements, e.g., the Pfizer mRNA vaccine needs to be transported at −70° C.

Therefore, there is a need to provide a phase change material having good stability and low phase change temperature.

SUMMARY

The present disclosure has been made in view of the above state of the art, and an object thereof is to provide a phase change material having good stability and low phase change temperature.

For this purpose, the present disclosure provides an ultra-low temperature phase change gel, including a phase change matrix, a temperature regulator and a nucleating agent. The phase change matrix is used as a host material for phase change to store and release cooling capacity, the temperature regulator is used for regulating a phase change temperature of the phase change matrix, the nucleating agent is used for lowering a supercooling degree of the phase change matrix, the phase change matrix includes a temperature control material and water, the temperature control material includes sodium silicate, dipotassium hydrogen phosphate and aluminum sulfate, and the temperature regulator includes polyethylene glycol, the nucleating agent includes a composite material formed by free radical polymerization of a reaction monomer and a macroinitiator, the composite material is polyacrylic acid grafted with silica hybrid nano particles, and in the ultra-low temperature phase change gel, a mass percentage of the phase change matrix is 95-97%, a mass percentage of the temperature regulator is 2-4%, and a mass percentage of the nucleating agent is 1-2%.

In the present disclosure, a phase change matrix including a temperature control material and water is used as a host material for phase change to store and release cooling capacity so that the ultra-low temperature phase change gel has higher phase change latent heat; adding a temperature regulator into the phase change matrix to regulate the phase change temperature of the phase change matrix, and adding a nucleating agent to lower the supercooling degree of the phase change matrix so that the phase change temperature of the phase change matrix is within a preset range; in addition, the nucleating agent is dispersed in the ultra-low temperature phase change gel so that the phase separation phenomenon may be reduced, the circulation stability of the ultra-low temperature phase change gel may be improved, and the ultra-low temperature phase change gel may be kept in a fixed shape in the phase change process.

In addition, in the ultra-low temperature phase change gel to which the present disclosure relates, alternatively, the polyethylene glycol has hydroxyl groups on both ends, and in the ultra-low temperature phase change gel, hydrogen bonds are formed between the hydroxyl groups and the phase change matrix to adjust thermal performance parameters of the phase change matrix so that a phase change temperature of the phase change matrix is in a preset range.

In addition, in the ultra-low temperature phase change gel to which the present disclosure relates, alternatively, the nucleating agent lowers the supercooling degree of the phase change matrix by inducing crystallization behavior of the phase change matrix so that a phase change temperature of the ultra-low temperature phase change gel is in a preset range.

In addition, in the ultra-low temperature phase change gel to which the present disclosure relates, alternatively, a particle size of the nucleating agent is 100-900 nm. In this case, the nucleating agent may be dispersed in the ultra-low temperature phase change gel more effectively, thereby facilitating to reduce the generation possibility of a phase separation phenomenon.

In addition, in the ultra-low temperature phase change gel to which the present disclosure relates, alternatively, in the polyacrylic acid grafted with silica hybrid nano particles, a molar ratio of the silica to the polyacrylic acid is from 1:1 to 1:4. Thus, more effective dispersion of the nucleating agent in the ultra-low temperature phase change gel may be facilitated.

In addition, in the ultra-low temperature phase change gel to which the present disclosure relates, alternatively, a preparation method of the nucleating agent includes the following steps: preparing the reaction monomer and the macroinitiator as prepared raw materials; adding the prepared raw materials into an organic solvent for mixing to obtain a mixed solution; adding a guide agent into the mixed solution to carry out Reversible Addition Fragmentation Chain Transfer Polymerization reaction to obtain a suspension; dropping the suspension into a precipitant for precipitation to obtain the nucleating agent. The reactive monomer includes acrylic acid and the macroinitiator includes silica-dithioester. Therefore, the nucleating agent with a good nucleating effect may be obtained, and the ultra-low temperature phase change gel may be kept in a fixed shape in the phase change process.

In addition, in the ultra-low temperature phase change gel to which the present disclosure relates, alternatively, in the prepared raw material of the nucleating agent, a mass percentage of the reaction monomer is from 87% to 93%, a mass fraction of the macroinitiator is from 6% to 12%, and a mass fraction of the guide agent is 1%.

In addition, in the ultra-low temperature phase change gel to which the present disclosure relates, alternatively, the temperature control material is a mixture of sodium silicate, dipotassium hydrogen phosphate and aluminum sulfate, in the phase change matrix, a mass fraction of the sodium silicate is 6.25-14.7%, a mass percentage of the dipotassium hydrogen phosphate is 4.1-7.4%, and a mass percentage of the aluminum sulfate is 6.25-10.5%. In this case, it may be facilitated that the phase change temperature of the phase change matrix is lowered by adding the temperature control material so as to adjust the phase change temperature of the ultra-low temperature phase change gel.

In addition, in the ultra-low temperature phase change gel to which the present disclosure relates, alternatively, in the phase change matrix, a mass percentage of the temperature control material is from 16.7% to 31.5%. In this case, the ultra-low temperature phase change gel may have a suitable phase change temperature.

In addition, in the ultra-low temperature phase change gel to which the present disclosure relates, alternatively, in the phase change matrix, a mass percentage of water is from 68.5% to 83.3%. In this case, the ultra-low temperature phase change gel may have a high latent heat of phase change.

According to the present disclosure, the ultra-low temperature phase change gel with good stability and low phase change temperature may be provided.

BRIEF DESCRIPTION OF THE DRAWINGS

Illustrative embodiments of the present disclosure are described in detail below with reference to the attached drawing figures.

DETAILED DESCRIPTION

Figure 1:
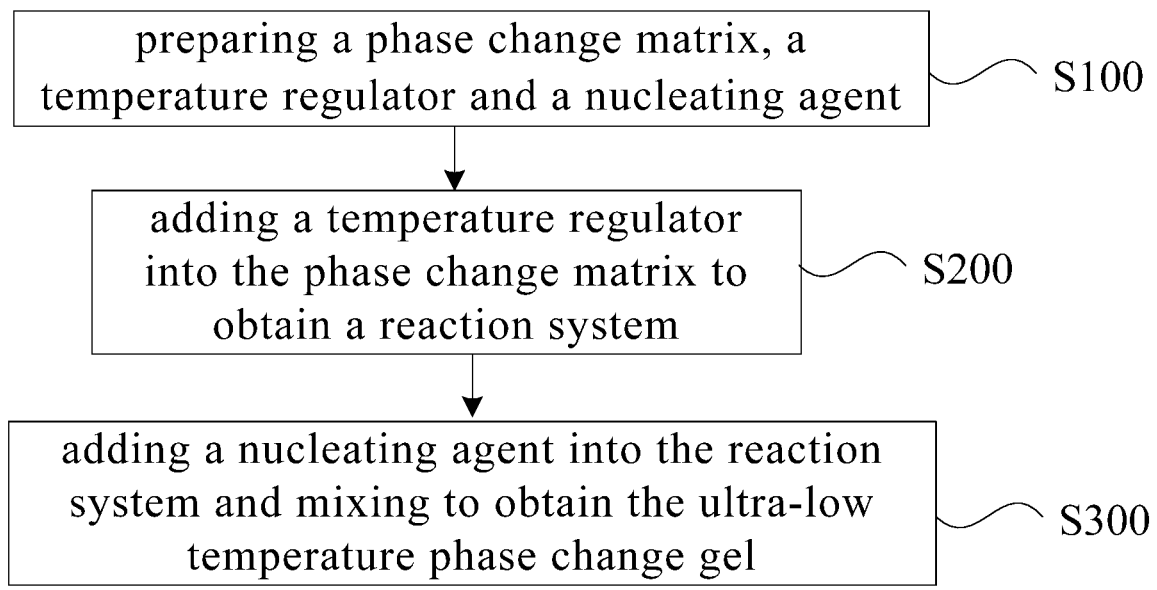
FIG. 1 is a flowchart illustrating a method of preparing an ultra-low temperature phase change gel according to an example of the present disclosure.

The following describes some non-limiting exemplary embodiments of the invention with reference to the accompanying drawings. The described embodiments are merely a part rather than all of the embodiments of the invention. All other embodiments obtained by a person of ordinary skill in the art based on the embodiments of the disclosure shall fall within the scope of the disclosure.

In the present embodiments, the ultra-low temperature phase change gel (hereinafter may simply be referred to as a phase change gel) to which the present disclosure relates may be used as a coolant, for example, for refrigerated transportation, biopharmaceutical and blood sample cold chain transportation, etc., such as may be used as a coolant for maintaining the temperature at −80° C. to −70° C.

In some examples, the phase change gels of the present disclosure may be used for refrigerated transportation, routine refrigerated use, and the like. As a coolant for refrigerated transportation, in some examples, it may be used for refrigerated carriages, refrigerated ice bags, mobile cold storage, etc.; as the coolant used for routine refrigeration, in some examples, it may be used in cold storage, vehicle-mounted incubators, and the like.

In some examples, the phase change gels of the present disclosure may be used as coolants for the storage or transportation of pharmaceuticals, reagents, vaccines, blood products, biological samples, and related products.

In some examples, when the phase change gel of the present disclosure being used, the phase change gel may be filled within sealed packages prepared for use as cooling bags. The cooling bags manufactured in this way may be placed in an incubator to cold-insulate objects to be insulated (such as foods, medicines and the like) in the incubator.

In some examples, the phase change gels of the present disclosure may be in a high viscosity gel state, thereby reducing leakage during phase change. Also, the phase change gel may have plasticity.

In particular, in some examples, the cooling bags containing the phase change gel are various in shape, for example, the shape of the cooling bag may be adaptively configured according to the shape of the object to be cold-insulated in the incubator so that the cooling bag may sufficiently contact the object to be insulated, the cooling bag may sufficiently exchange heat with the object to be insulated, and the insulation effect is improved.

In some examples, the phase change gels of the present disclosure may also be Form-stable phase change materials (FSPCM). For example, the phase change gel may be a shaped phase change material. Therefore, the leakage phenomenon in the phase change process may be reduced.

In some examples, in case that the phase change gel is a shape stable phase change material, the phase change gel may absorb or release heat through a solid-liquid phase change.

In this embodiment, the phase change gel may include a phase change matrix and a nucleating agent.

In some examples, the phase change temperature of the phase change gel may be from −80° C. to −70° C. Thus, it may be applied to a scenario whose temperature requires to keep the temperature at −80° C. to −70° C. For example, the phase change temperature of the phase change gel may be −70° C., −71° C., −72° C., −73° C., −74° C., −75° C., −76° C., −77° C., −78° C., −79° C., or −80° C.

In some examples, the pH of the phase change gel may be Alkaline. For example, the phase change gel may have a pH value of 10 to 12. In this case, the growth of the crystal nucleus may be facilitated.

In some examples, the phase change matrix may serve as a host material for storing and releasing cooling capacity. Additionally, in some examples, the phase change matrix may include water, a temperature regulator, and a temperature control material.

In some examples, the phase change matrix may include water. In the phase change matrix, the mass percentage of water may range from 68.5 to 83.3%. For example, the mass percentage of the mass fraction of water in the phase change matrix may be 68.5%, 69%, 70%, 71%, 71.5%, 72%, 73%, 73.7%, 74%, 75%, 76%, 77%, 78%, 79%, 80%, 82%, or 83.3%. In addition, optionally, in the phase change matrix, the water may be deionized water.

In some examples, the water may serve as the primary energy storage material in the phase change matrix.

In some examples, the phase change matrix may include a temperature control material. In the phase change matrix, the mass percentage of the temperature control material may be from 16.7% to 31.5%. For example, in a phase change matrix, the mass percent of the temperature control material may be 16.7%, 17%, 18%, 19%, 20%, 22%, 23%, 23.4%, 24%, 25%, 26%, 26.3%, 27%, 28%, 30%, or 31.5%.

In some examples, the temperature control material may include sodium silicate, dipotassium hydrogen phosphate, and aluminum sulfate. In this case, sodium silicate, dipotassium hydrogen phosphate, and aluminum sulfate may physically form a low-temperature eutectic salt and be compounded with water so that the phase change temperature of the phase change matrix is within a predetermined range.

In some examples, the temperature control material may be a mixture of sodium silicate, dipotassium hydrogen phosphate, and aluminum sulfate. In some examples, the phase change matrix may be a mixture of a temperature control material and water.

In some examples, the mass percent of sodium silicate in the phase change matrix may be from 6.25% to 14.7%. For example, the mass percent of sodium silicate in the phase change matrix may be 6.25%, 7%, 7.3%, 8%, 9%, 10%, 10.5%, 11%, 11.5%, 12%, 12.5%, 13%, 13.5%, or 14.7%. In general, in the phase change matrix, too high or too low proportion of sodium silicate may result in too high phase change temperature of the phase change matrix, which is unfavorable for reducing the phase change temperature of the phase change matrix.

In some examples, the mass percent of dipotassium hydrogen phosphate in the phase change matrix may be from 4.1% to 7.4%. For example, the mass percent of dipotassium hydrogen phosphate in the phase change matrix may be 4.1%, 4.5%, 4.8%, 5%, 5.3%, 5.5%, 5.8%, 6.5%, or 7.4%. In general, too high proportion of dipotassium hydrogen phosphate may result in too high phase change temperature of the phase change matrix; too low proportion of dipotassium hydrogen phosphate may incur that a double-platform temperature of the phase change matrix appears in the phase change process, that is, two different phase change temperatures of the phase change matrix appear in the whole phase change process. Here, one phase change temperature may be in the ultra-low temperature region (−80° C. to −65° C.), and the other phase change temperature may be in the low temperature region area (−30° C. to −20° C.).

In some examples, the mass percent of aluminum sulfate in the phase change matrix may be from 6.25% to 10.5%. For example, the mass percent of aluminum sulfate in the phase change matrix may be 6.25%, 6%, 6.5%, 6.9%, 7%, 7.5%, 8%, 8.4%, 8.8%, 9%, 9.6%, 9.8%, or 10.5%. In general, too high proportion of aluminum sulfate may incur too high phase change temperature of the phase change matrix; while too low proportion of aluminum sulfate may result in double-platform temperature of the phase change matrix appearing in the phase change process.

In some examples, the mass percent of sodium silicate in the temperature control material may be from 37.5% to 50%. In some examples, the mass percent of dipotassium hydrogen phosphate in the temperature control material may be from 18% to 27%. In other examples, the mass percentage of aluminum sulfate in the temperature control material may be from 31% to 37.5%.

In some examples, the mass ratio of sodium silicate to dipotassium hydrogen phosphate in the temperature control material may be from 1:0.36 to 1:0.67. For example, the mass ratio of sodium silicate to dipotassium hydrogen phosphate may be 1:0.36, 1:0.4, 1:0.5, or 1:0.67. In this case, the phase change temperature of the phase change matrix may be adjusted to be within a predetermined range.

In some examples, the mass ratio of dipotassium hydrogen phosphate to aluminum sulfate in the temperature control material may be from 1:13 to 1:71. For example, the mass ratio of dipotassium hydrogen phosphate to aluminum sulfate may be 1:1.13, 1:1.2, 1:1.3, 1:1.5, 1:1.6, or 1:1.71. Optionally, the mass ratio of dipotassium hydrogen phosphate to aluminum sulphate may be from 1:1.5 to 1:1.7. In this case, the phase change temperature of the phase change matrix may be adjusted to be within a predetermined range.

In some examples, the temperature control material may adjust the phase change temperature of the phase change matrix. In other words, the phase change temperature of the phase change gel may be adjusted through the temperature control material.

In some examples, the phase change matrix may further include a pH regulator. In other examples, the mass percent of the pH regulator in the phase change matrix may range from 0.2% to 0.5%. For example, the mass percent of the pH regulator may be 0.2%, 0.3%, 0.4%, or 0.5%.

In some examples, a pH regulator may be used to adjust the pH of the phase change matrix, for example, the pH of the phase change matrix may be set at a predetermined pH and maintained at the predetermined pH. Additionally, in some examples, the predetermined pH may be from 10 to 12.

That is, the phase change matrix may have a pH value of 10 to 12, thereby promoting fine nucleation of the phase change matrix and stabilizing nucleation. For example, the phase change matrix may have a pH value of 10, 10.5, 11, 11.5, or 12.

In some examples, the pH regulator may be at least one of sodium hydroxide, potassium hydroxide, or magnesium hydroxide. Optionally, the pH regulator may be sodium hydroxide.

In some examples, the phase change matrix may be formed by mixing water and a temperature control material. In other examples, the phase change matrix may be formed by mixing water, a temperature control material, and a pH regulator.

In this embodiment, the phase change matrix has good dispersibility through proportional mixture of the ingredient so that the occurrence of sedimentation in the phase change matrix may be reduced.

In some examples, the temperature regulator may include polyethylene glycol. In this case, the polyethylene glycol has hydroxyl groups on both ends, hydrogen bonds may be formed between the hydroxyl groups and the phase change matrix to adjust the thermal performance parameters of the phase change matrix so that the phase change temperature of the phase change matrix is in a preset range.

In some examples, the polyethylene glycol may have an average molecular weight of 400 Da.

In other examples, the temperature regulator may include glycerin.

In some examples, the mass ratio of the phase change matrix to the temperature regulator may be from 1:0.02 to 1:0.042. For example, the mass ratio of phase change matrix to temperature regulator may be 1:0.02, 1:0.021, 1:0.025, 1:0.03, 1:0.032, 1:0.035, 1:0.041, or 1:0.042.

In some examples, the nucleating agent may include a composite formed by free radical polymerization of a reactive monomer and a macroinitiator. The free radical polymerization may be Reversible Addition Fragmentation Chain Transfer Polymerization (RAFT).

In some examples, the nucleating agent may include a composite formed from a reactive monomer and a macroinitiator via Reversible Addition Fragmentation Chain Transfer Polymerization (RAFT) under the action of a guide agent. In this case, a nucleating agent having a stable structure may be obtained, thereby enabling the phase change gel to maintain a fixed shape during the phase change.

In some examples, the reactive monomer may be acrylic acid.

In some examples, the macroinitiator may be prepared by subjecting the first particles to an amino modification treatment to obtain aminated first particles, and then subjecting the aminated first particles to an esterification reaction with an esterification reagent under the action of an esterification catalyst. Here, the first particles may be silica. The esterification reagent may be S-1-dodecyl-S'-($\alpha,\alpha'$-dimethyl-$\alpha''$-acetic acid)trithiocarbonate (DDAT). The esterification catalyst may be a mixture of a hydrochloride and 4-dimethylaminopyridine. In this case, the first particles and the esterification reagent are capable of undergoing an esterification reaction under the action of an esterification catalyst.

In some examples, the mass ratio of the aminated first particles to the esterification reagent may be from 1:0.3 to 1:0.5. In some examples, the mass ratio of the aminated first particles to the esterification catalyst may be from 1:0.15 to 1:0.25.

In some examples, the macroinitiator may include silica-dithioesters ($SiO_2$-CTA) with silica groups formed by amino modification of silica followed by esterification with S-1-dodecyl-S'-($\alpha,\alpha'$-dimethyl-$\alpha''$-acetic acid) trithiocarbonate (DDAT). In some examples, the guide agent may include 4,4'-azobis(4-cyanovaleric acid) (ACVA). Therefore, the RAFT of the reaction monomer and the macroinitiator under the action of the guide agent may be realized.

In some examples, the composite may be polyacrylic acid grafted with silica hybrid nanoparticles ($SiO_2$-g-PAA) formed by RAFT of acrylic acid with $SiO_2$-CTA under the action of ACVA. In other words, in some examples, the nucleating agent may include $SiO_2$-g-PAA. In this case, the silica nanoparticles may guide the crystallization behavior of the phase change matrix and lower the supercooling degree of the phase change matrix so as to guide the phase change matrix to solidify within a predetermined phase change temperature, and in addition, the polyacrylic acid group may improve the dispersibility of the nucleating agent so as to disperse the nucleating agent in the phase change matrix, thereby facilitating the shaping of the phase change gel and improving the cycle stability of the phase change gel and allowing the phase change gel to have a predetermined phase change temperature.

In some examples, in $SiO_2$-g-PAA, the molar ratio of silica ($SiO_2$) to polyacrylic acid (PAA) may be from 1:1 to 1:4.

In some examples, the composite may be an AB-type diblock copolymer. For example, the composite may be $SiO_2$-g-PAA. Here, $SiO_2$-g-PAA may take $SiO_2$ as main chain and PAA as side chain.

In some examples, the nucleating agent may be spherical, cylindrical, or irregular. In some examples, the particle size of the nucleating agent may be from 100 nm to 900 nm. In this case, dispersion of the nucleating agent in the phase change gel may be facilitated, thereby resulting in reduction of the phase separation phenomenon generated during the phase change. The particle size of the nucleating agent may be the diameter of the nucleating agent particles.

In some examples, the nucleating agent may have a molecular weight of 100,000 Da to 1,000,000 Da. Thus, the dispersibility of the nucleating agent may be improved. For example, the molecular weight of the nucleating agent may be 100,000 Da, 200,000 Da, 300,000 Da, 400,000 Da, 500,000 Da, 600,000 Da, 700,000 Da, 800,000 Da, 900,000 Da, or 1,000,000 Da. In the present disclosure, the molecular weight of the nucleating agent may be a number average molecular weight.

In some examples, the mass ratio of the reactive monomer to the macroinitiator may be from 1:0.065 to 1:0.14, and the mass ratio of the reactive monomer to the guide agent may be from 1:0.005 to 1:0.015. Thus, RAFT reactions may be facilitated and nucleating agents may be formed. For example, the mass ratio of reactive monomer to macroinitiator may be 1:0.065, 1:0.07, 1:0.08, 1:0.09, 1:0.1, 1:0.11, 1:0.12, 1:0.13, or 1:0.14. The mass ratio of the reactive monomer to the guide agent may also be 1:0.005, 1:0.007, 1:0.008, 1:0.01, 1:0.012, 1:0.013, or 1:0.015.

In this embodiment, the nucleating agent may have good thermal and mechanical stability. Thus, the cycle stability of the phase change gel may be improved.

In this embodiment, the phase change gel may include the nucleating agent described above. Thus, a form-stable phase change gel may be formed. In addition, the nucleating agent may play a role of a crystal nucleus in the phase change matrix, and lower the supercooling degree of the phase change matrix by inducing crystallization behavior of the phase change matrix so that the phase change temperature of the ultra-low temperature phase change gel is in a preset range.

In the present embodiment, the mass ratio of the phase change matrix to the nucleating agent in the phase change gel may be 1:0.01 to 1:0.021. For example, the mass ratio of phase change matrix to nucleating agent may be 1:0.01, 1:0.011, 1:0.015, 1:0.018, 1:0.02, or 1:0.021.

In some examples, if the content of the nucleating agent is too low, the phase change gel is not easy to be nucleated because the content of the nucleating agent is too low, the expected effect of lowering the supercooling degree cannot be achieved, and the phase change gel may easily leak in the phase change process; if the content of the nucleating agent is excessive, the unit energy storage density of the phase change gel is easily reduced due to the excessive content of the nucleating agent, that is, the phase change latent heat of the phase change gel is reduced.

In some examples, the phase change gel may be formed by mixing a phase change matrix, a temperature regulator, and a nucleating agent. In other examples, the phase change gel may be formed by mixing a phase change matrix, a temperature regulator, and a nucleating agent to gel.

In some examples, if the phase change matrix is well dispersed, the phase change matrix may remain dispersed for a long period of time (e.g., 1 day), thereby enabling the formation of a well dispersed phase change gel with the nucleating agent.

In some examples, if the phase change matrix has poor dispersibility, the phase change matrix may settle during gelation with the nucleating agent, in that case the phase change temperature of the phase change gel changes during formation along with the phase change matrix settles, and the phase change temperature of the phase change gel may decrease.

In the present embodiment, in the system of the phase change gel, the combination of ingredients and their proportions enables the phase change temperature of the phase change gel to be between −80° C. and −70° C., and the phase change gel has the effects of high phase change latent heat and good cycle stability.

In the phase change gel disclosed by this disclosure, a temperature control material is used for obtaining high phase change latent heat, and a phase change matrix, a temperature regulator and a nucleating agent are mixed so that the phase change gel may be kept in a fixed shape in the phase change process, the reduction of generation of a phase separation phenomenon may be facilitated, and thereby the cycle stability may be improved.

Figure 2:
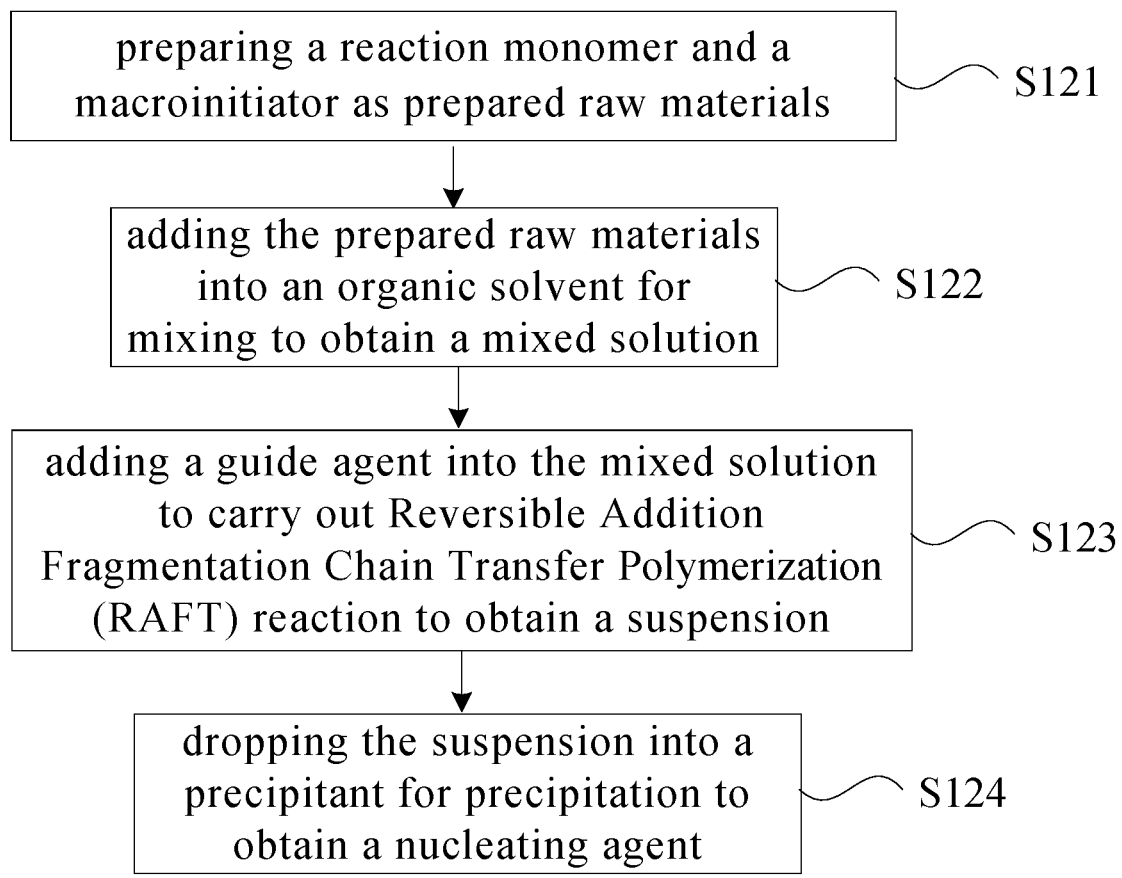
FIG. 2 is a flow chart illustrating a method of preparing a nucleating agent according to an example of the present disclosure.

Hereinafter, the preparation method of the phase change gel involved in the example of this embodiment will be described in detail with reference to FIGS. 1, 2 and 3. FIG. 1 is a flowchart illustrating a preparation method of a temperature phase change gel according to an example of the present disclosure. FIG. 2 is a flow chart illustrating a method of preparing a nucleating agent according to an example of the present disclosure.

In the present embodiment, as shown in FIG. 1, the preparation method of the ultra-low temperature phase change gel may include: preparing a phase change matrix, a temperature regulator and a nucleating agent (step S100); adding a temperature regulator into the phase change matrix to obtain a reaction system (step S200); adding a nucleating agent into the reaction system and mixing to obtain the ultra-low temperature phase change gel (step S300). In addition, step S100 may include preparation of a phase change matrix (step S110) and preparation of a nucleating agent (step S120). In addition, for illustration convenience, FIG. 1 indicates the order of step S110 which is before step 120 in order, however, in fact, in this embodiment, the orders of step S110 and step 120 are not specifically limited.

In some examples, in step S110, the phase change matrix may be formed by mixing water with a temperature control material. Here, the mass percentage of water may be 16.7-31.5%, and the mass percentage of the temperature control material may be 68.5-83.3%. Thereby, it is facilitated to obtain a homogeneous phase change matrix, which in turn may facilitate to improve the phase separation problem of the phase change gel. In addition, the detailed description with respect to the phase change matrix may refer to the above description with respect to the phase change matrix in the phase change gel.

In some examples, in step S110, the phase change matrix may be obtained by mixing water, a temperature control material and a pH regulator. Thereby, it is facilitated to obtain a homogeneous phase change matrix, which in turn may facilitate to improve the phase separation problem of the phase change gel.

In some examples, in step S110, the temperature control material may include sodium silicate, dipotassium hydrogen phosphate, and aluminum sulfate. In addition, the detailed description of the temperature control material may refer to the above description of the temperature control material in the phase change matrix.

In some examples, in step S110, the order in which sodium silicate, dipotassium hydrogen phosphate, and aluminum sulfate are added to the water is not required. For example, sodium silicate, dipotassium hydrogen phosphate and aluminum sulfate may be added simultaneously, or sodium silicate, dipotassium hydrogen phosphate and aluminum sulfate may be added sequentially in this order.

In some examples, in step S110, the water and temperature control material may be mixed by stirring. In some examples, in step S110, the water and the temperature control material may be uniformly mixed by stirring at a rotation speed of 300 rad/m to 600 rad/m (revolutions per minute) for 5 h to 6 h under the condition of 60° C. to 80° C. For example, the water may be thoroughly mixed with the temperature control material by stirring at 80° C. for 5 h.

As described above, step S100 may include a preparation step of a nucleating agent (step S120). Additionally, in some examples, the nucleating agent may be formed by compounding a reactive monomer with the first particles.

In some examples, in step S120, as shown in FIG. 2, the preparation method of the nucleating agent may include the steps of: preparing a reaction monomer and a macroinitiator as prepared raw materials (step S121); adding the prepared raw materials into an organic solvent for mixing to obtain a mixed solution (step S122); adding a guide agent into the mixed solution to carry out Reversible Addition Fragmentation Chain Transfer Polymerization (RAFT) reaction to obtain a suspension (step S123); dropping the suspension into a precipitant for precipitation to obtain a nucleating agent (step S124). Thus, by steps S121 to S124 as above, a nucleating agent may be obtained.

In some examples, in step 121, the mass ratio of reactive monomer to macroinitiator may be from 1:0.065 to 1:0.14. In some examples, in the prepared raw material of step S121, the mass percentage of the reaction monomer may be from 87% to 93%. Therefore, the reaction rate may be increased, and the prepared nucleating agent has certain mechanical strength. For example, the mass percentage of the reaction monomer may be 90%.

In some examples, the mass percent of the macroinitiator in the prepared raw material of step S121 may be from 6% to 12%. Thereby, the formation of nucleating agents with good mechanical performance and thermal stability may be facilitated. For example, the mass percent of the macroinitiator may be 9%.

In some examples, in the prepared raw material of step S121, the mass fraction of the guide agent may be 1%. Thereby, the progress of the reaction may be facilitated.

In some examples, in step S121, the reactive monomer may include acrylic acid and the macroinitiator may include silica-dithioester (SiO$_2$-CTA). In addition, as to the specific description of the reactive monomer, the macroinitiator in the preparation method, reference may be made to the above description of the phase change gel.

Figure 3:
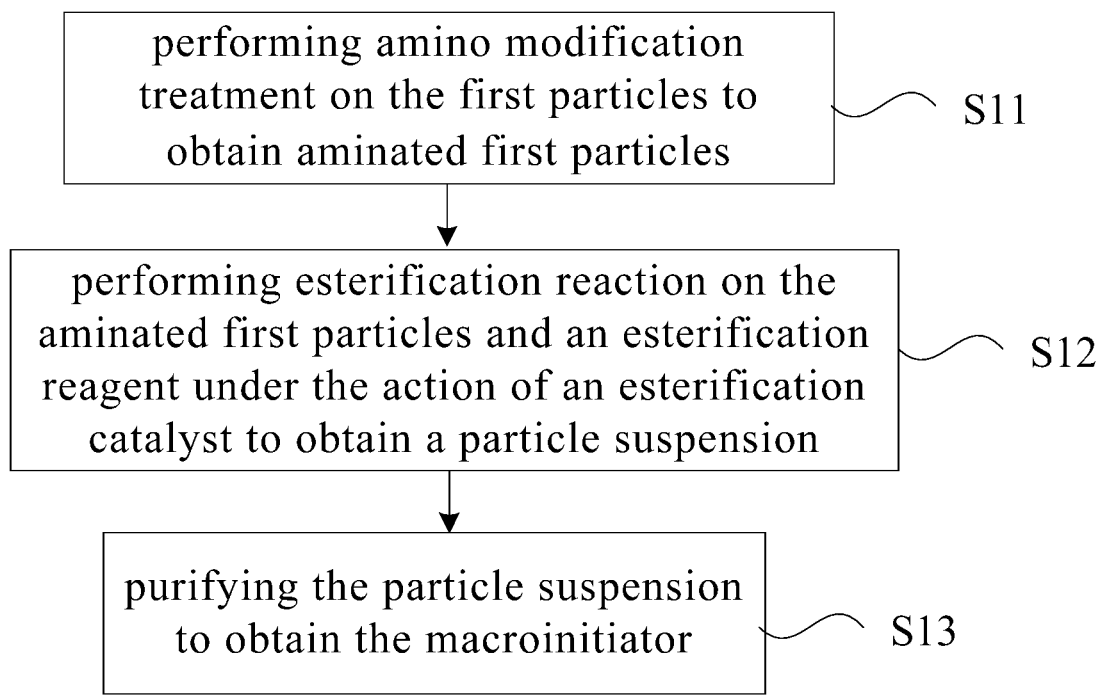
FIG. 3 is a flow chart illustrating a method of preparing a macroinitiator according to an example of the present disclosure.

FIG. 3 is a flow chart illustrating a method of preparing a macroinitiator according to an example of the present disclosure.

In some examples, in step S121, as shown in FIG. 3, the step of preparing the macroinitiator may include: performing amino modification treatment on the first particles to obtain aminated first particles (step S11); performing esterification reaction on the aminated first particles and an esterification reagent under the action of an esterification catalyst to obtain a particle suspension (step S12); purifying the particle suspension to obtain the macroinitiator (step S13).

In some examples, in step S11, the first particles may be silica.

In some examples, in step S12, the esterification reagent may include S-1-dodecyl-S'-(α,α'-dimethyl-α"-acetic acid) trithiocarbonate (DDAT). In some examples, the esterification catalyst may include a mixture of a hydrochloride and 4-dimethylaminopyridine. In this case, the first particles may be subjected to an esterification reaction with an esterification reagent under the action of an esterification catalyst.

For example, in some examples, the silica may be subjected to an amino modification treatment to obtain an aminated silica (SiO$_2$—NH$_2$); then SiO$_2$—NH$_2$ was esterified with S-1-dodecyl-S'-(α,α'-dimethyl-α"-acetic acid) trithiocarbonate (DDAT) to form SiO$_2$-CTA macroinitiator with silica groups.

In some examples, in step S12, the mass ratio of the aminated first particles to the esterification reagent may be from 1:0.3 to 1:0.5. In some examples, the mass ratio of the aminated first particles to the esterification catalyst may be from 1:0.15 to 1:0.25.

In some examples, in step S12, the mass ratio of the hydrochloride and 4-dimethylaminopyridine in the esterification catalyst may be from 1:1.1 to 1:1.5. Thus, it may be advantageous to increase the reaction rate.

In some examples, in step S12, an esterification dissolving agent may be used to dissolve the aminated first particles and the esterification reagent. The esterification dissolving agent may include trichloromethane. In some examples, the mass to volume ratio of the aminated first particles to the esterifying solubilizing agent may be from 1 g:140 mL to 1 g 200 mL.

In some examples, in step S12, the esterification reaction may be performed at room temperature. For example, the esterification reaction may be performed with vigorous stirring at room temperature for 24 h. Thus, it may be advantageous to increase the reaction rate.

In some examples, in step S13, the particle suspension may be purified to obtain a macroinitiator. In some examples, alternatively, the macroinitiator in the particle suspension is washed and separated with a wash solution which is repeated no less than 3 times (e.g., 4 times, 5 times, 6 times, etc.) to purify the macroinitiator. In addition, the washing liquid may be at least one of ethanol and water.

In some examples, in step S122, the organic solvent may include dimethyl sulfoxide (DMSO). In some examples, the mass to volume ratio of the reaction monomer to the organic solvent may be from 1 g:10 mL to 1 g:20 mL. In this case, the Reversible Addition Fragmentation Chain Transfer Polymerization (RAFT) reaction may be facilitated.

In some examples, in step S122, the reaction monomer and the macroinitiator may be added with stirring. Thus, uniform mixed liquid may be facilitated to be obtained.

In some examples, the reaction monomer, the macroinitiator, and the guide agent may be simultaneously added to the organic solvent for the reaction.

In some examples, in step S123, nitrogen may be introduced prior to the addition of the guide agent. In this case, the introduction of nitrogen may remove oxygen from the reaction environment.

In some examples, in step S123, the guide agent may be 4,4'-azobis(4-cyanovaleric acid) (ACVA). In some examples, the mass ratio of reactive monomer to guide agent may be 1:0.01. Thus, it may be advantageous to increase the reaction rate.

In some examples, in step S123, the reaction may be performed under conditions of 60° C. to 80° C. for 4 to 10 h. In this case, sufficient reaction between the reaction monomer, the macroinitiator, and the guide agent may be facilitated. For example, the reaction may be performed under 70° C. conditions for 6 h.

In some examples, in step S124, the precipitant may include at least one of tetrahydrofuran (THF), dimethylsulfoniopropionate (DMSP), N,N-dimethylformamide (DMF). In some examples, the suspension may be dropped into a precipitant to form a precipitate. In this case, it may be advantageous to form a stable nucleating agent.

In some examples, in step S124, the precipitate precipitated from the suspension may be collected by filtration. In some examples, the precipitate may be dried to yield a nucleating agent. For example, the precipitate may be dried in an oven.

In some examples, in step S200, the phase change matrix and the temperature regulator may be mixed in a predetermined mass ratio. Additionally, in some examples, the predetermined mass ratio may be from 1:0.02 to 1:0.042.

In some examples, in step S200, the temperature regulator may include at least one of polyethylene glycol or glycerin. The molecular weight of the polyethylene glycol may be 400 Da.

In some examples, in step S200, the phase change matrix and the temperature regulator may be mixed by stirring to form a reaction system. In some examples, in step S200, stirring may be utilized under the condition of 40° C. to 80° C. for 0.5 h to 2 h, thereby the phase change matrix and the temperature regulator may be mixed uniformly. For example, the phase change matrix and the temperature regulator may be fully mixed by stirring for 30 min at 50° C.

In some examples, in step S300, the mass ratio of phase change matrix to nucleating agent may be from 1:0.01 to 1:0.021.

In some examples, in step S300, the reaction system and the nucleating agent may be stirred for 1 h to 3 h under conditions of 70° C. to 120° C. to sufficiently disperse the nucleating agent in the reaction system. For example, the reaction system and nucleating agent may be reacted under 90° C. conditions for 2 h. In this case, the nucleating agent may be sufficiently dispersed in the reaction system.

In some examples, in step S300, after the nucleating agent is dispersed in the reaction system, a cooling treatment may be performed to cool the entire reaction system to normal temperature to obtain the ultra-low temperature composite phase change gel.

In the present embodiment, a detailed description of the phase change gel prepared by the preparation method may refer to the above description of the phase change gel. According to the present disclosure, the phase change gel with low phase change temperature and good cycle stability may be provided.

To further illustrate the present disclosure, the phase change gels provided by the present disclosure are described in detail below in connection with examples, and the beneficial effects achieved by the present disclosure are fully illustrated in connection with comparative examples.

Figure 4:
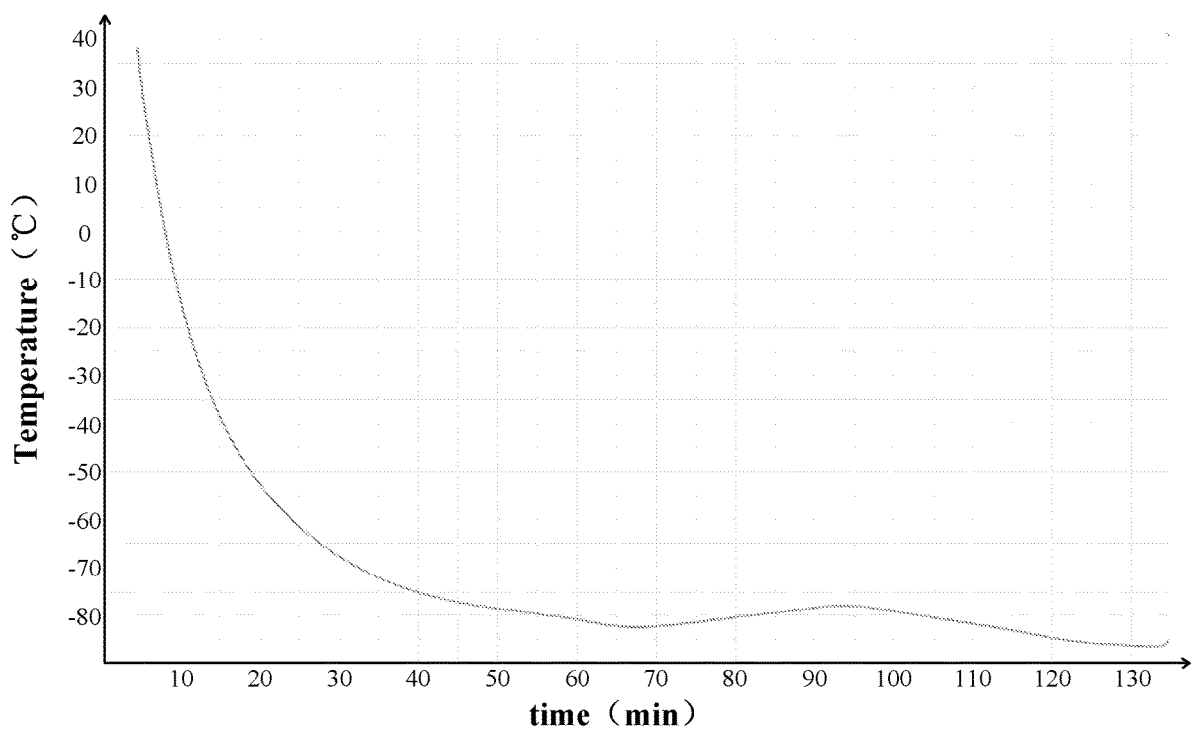
FIG. 4 is a step cooling curve showing an ultra-low temperature phase change gel according to Example 1 of the present disclosure.
Figure 5:
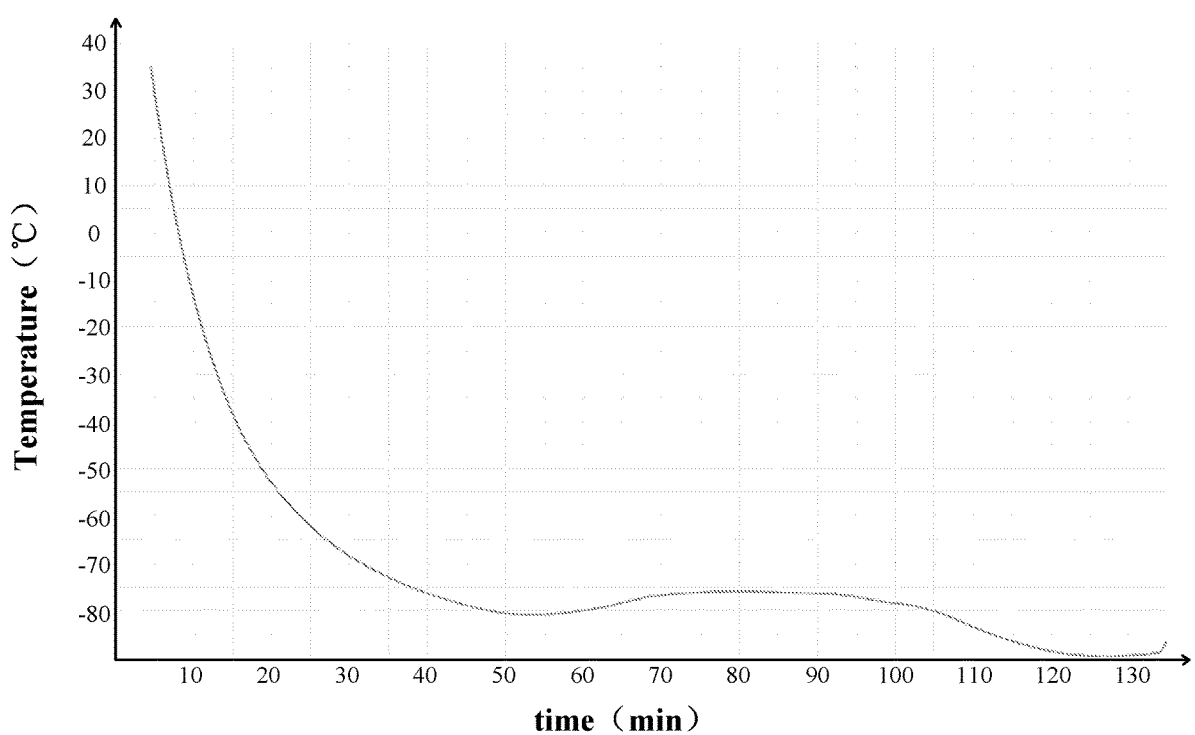
FIG. 5 is a step cooling curve showing an ultra-low temperature phase change gel according to Example 2 of the present disclosure.
Figure 6:
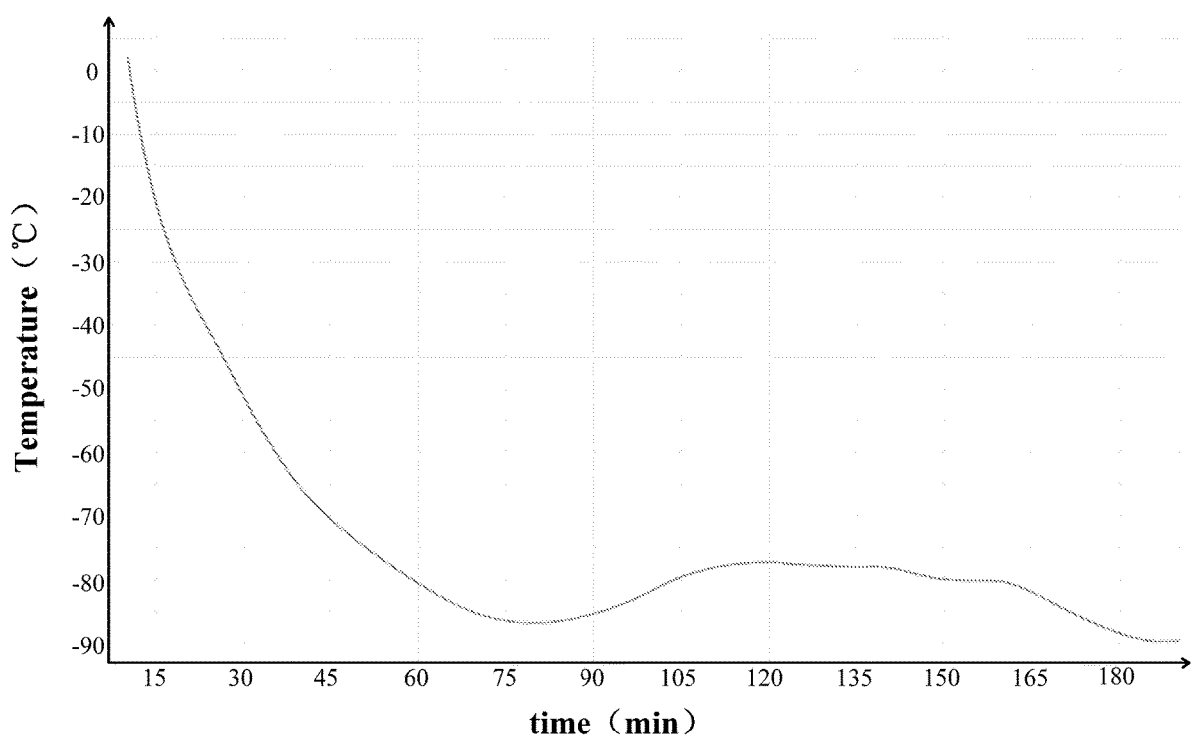
FIG. 6 is a step cooling curve showing an ultra-low temperature phase change gel according to Example 3 of the present disclosure.
Figure 7:
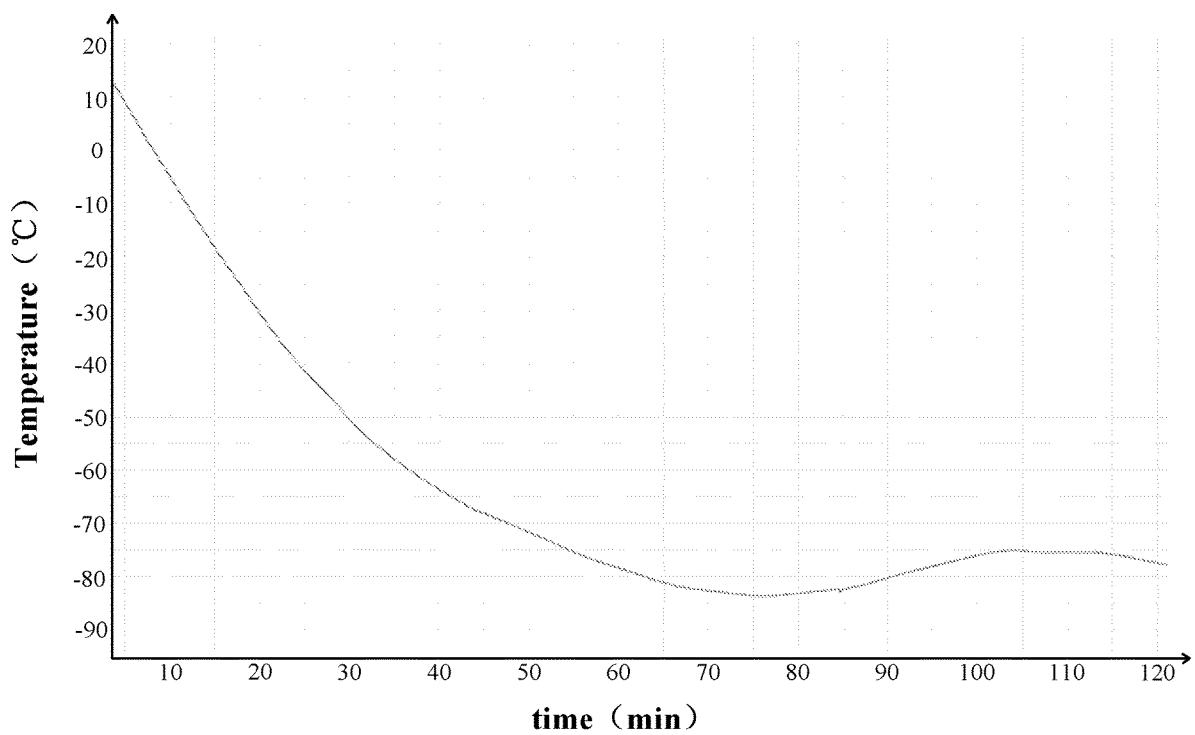
FIG. 7 is a step cooling curve showing an ultra-low temperature phase change gel according to Example 4 of the present disclosure.
Figure 8:
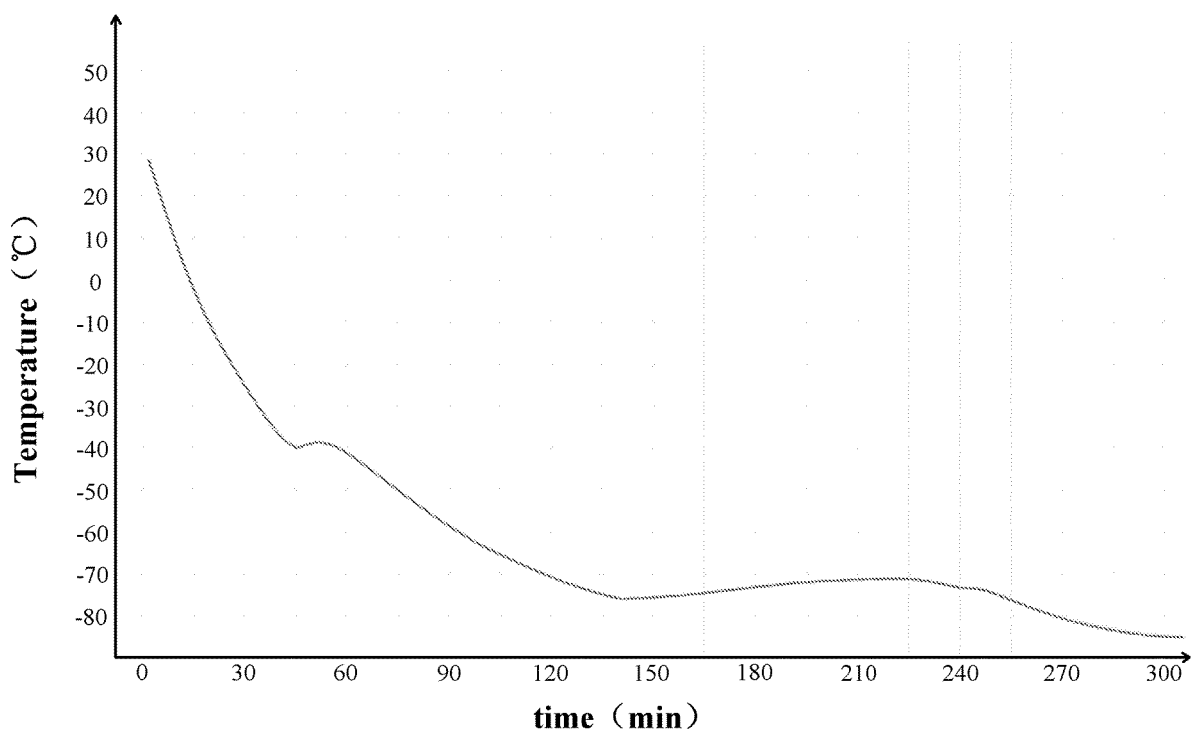
FIG. 8 is a step cooling curve showing an ultra-low temperature phase change gel according to Example 5 of the present disclosure.
Figure 9:
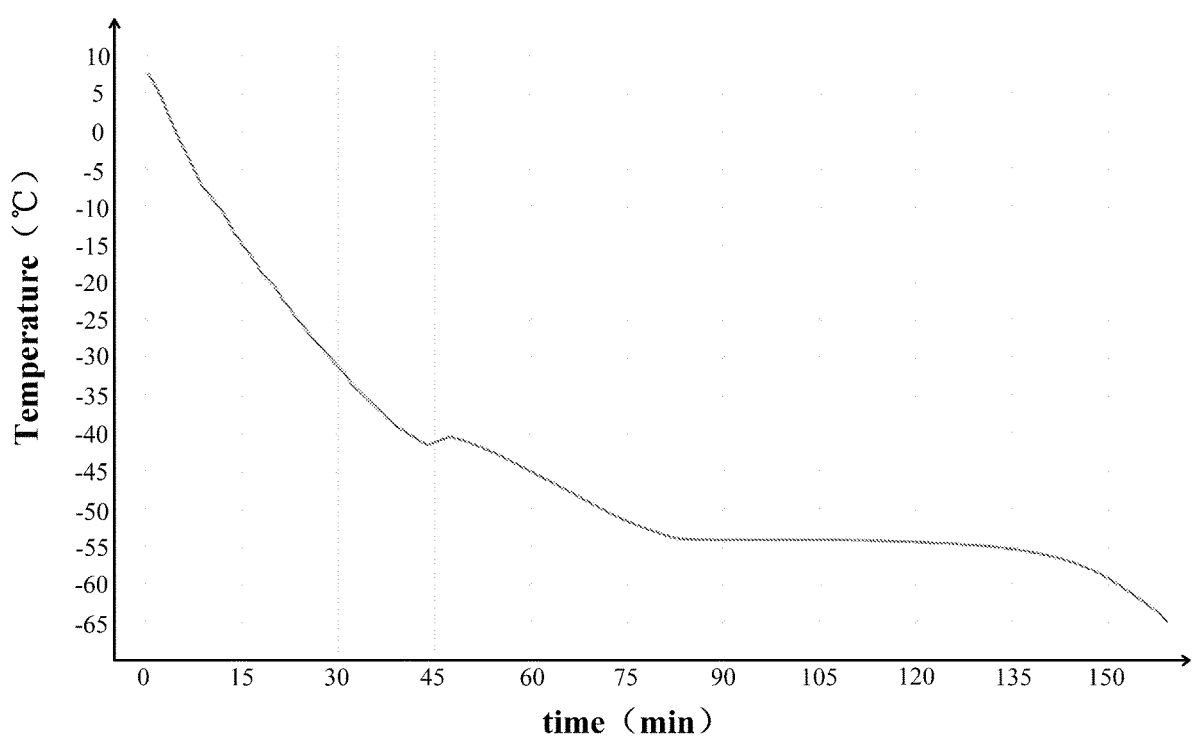
FIG. 9 is a step cooling curve showing a phase change gel according to Comparative Example 1 of the present disclosure.

FIG. 4 is a step cooling curve showing an ultra-low temperature phase change gel of Example 1 of the present disclosure. FIG. 5 is a step cooling curve showing an ultra-low temperature phase change gel of Example 2 of the present disclosure. FIG. 6 is a step cooling curve showing an ultra-low temperature phase change gel of Example 3 of the present disclosure. FIG. 7 is a step cooling curve showing an ultra-low temperature phase change gel of Example 4 of the present disclosure. FIG. 8 is a step cooling curve showing an ultra-low temperature phase change gel of Example 5 of the present disclosure. FIG. 9 is a step cooling curve showing the phase change gel of Comparative Example 1 of the present disclosure.

In an embodiment of the present disclosure, regarding the raw materials for preparing a phase change matrix, sodium silicate, dipotassium hydrogen phosphate, and aluminum sulfate are used as temperature control materials and sodium hydroxide is used as a pH regulator.

Regarding the raw material for preparing a nucleating agent, acrylic acid is taken as a reaction monomer, silica-dithioester ($SiO_2$-CTA) is taken as a macroinitiator, 4,4'-azobis(4-cyanovaleric acid) (ACVA) is taken as a guide agent, dimethyl sulfoxide (DMSO) is taken as an organic solvent, and tetrahydrofuran (THF) is taken as a precipitating agent. The specific steps for preparing the $SiO_2$-CTA macroinitiator are as follows. Adding 1.33 g of $SiO_2$—$NH_2$, 0.56 g of S-1-dodecyl-S'-($\alpha,\alpha$'-dimethyl-$\alpha$"-acetic acid) tri-thiocarbonate, 0.13 g of 1-ethyl-(3-dimethylaminopropyl) carbodiimide hydrochloride and 0.16 g of 4-dimethylaminopyridine into a 500 mL round bottom flask, then adding 200 mL of trichloromethane, and stirring vigorously at room temperature for 24 h to obtain a particle suspension, then collecting the suspended particles in the particle suspension by centrifugation using a centrifuge, washing three times with ethanol, and freeze-drying to obtain $SiO_2$-CTA particles.

EXAMPLES

In each of the examples 1 to 5, first, the phase change matrix of each example was prepared. Specifically, in each example, preparing a prepared raw material (total 500 g) of a phase change matrix according to the raw material ratio of the phase change matrix in Table 1, then mixing a temperature control material and deionized water under the condition of 80° C. and stirring for 5 h under the condition of a rotation speed of 600 rad/m, and then obtaining the phase change matrix of Examples 1 to 5; and the dispersion performance was characterized by testing the viscosity of the phase change matrix of each example, and the test results are shown in Table 3.

Next, the nucleating agent of each example was prepared. Specifically, in each example, preparing a prepared raw material of a nucleating agent according to the raw material ratio of the nucleating agent in Table 1, adding a reaction monomer and a macroinitiator to a round bottom flask, adding 150 mL of an organic solvent, introducing nitrogen into the round bottom flask for 30 min, adding a guide agent, performing a reaction under the condition of 70° C. for 6 h, then dropping the solution into the precipitating agent to form a precipitate, and collecting the precipitate by filtration and drying in an oven to obtain the nucleating agents of Examples 1 to 5.

Then, mixing the phase change matrix and the temperature regulator of Examples 1 to 5 in the proportions shown in Table 1, stirring for 30 min at 50° C. to form a reaction system, adding the nucleating agent of Examples 1 to 5 to the reaction system in the proportions shown in Table 1, and being reacted for 2 h at 90° C. and then cooling the whole reaction system to normal temperature to obtain the phase change gel of Examples 1 to 5.

The phase change gels of each example (Examples 1 to 5) prepared according to Table 1 were subjected to performance tests. Specifically, the phase change temperature, latent heat and cycle stability of the phase change gel prepared in each example are respectively tested through a step cooling curve and differential scanning calorimetry (DSC); the leakage problem was evaluated by observing whether the phase change gel of each example leaked during the cycle freezing. The performance test results of the phase change gels prepared in each example are shown in Table 2.

TABLE 1

Raw material ratios for preparing phase change gels

| | Formulation | | | | |
|---|---|---|---|---|---|
| Item | Raw material ratio (wt %) of phase change matrix | Temperature regulator | Ratio (wt %) of phase change matrix to temperature regulator | Raw material ratio (wt %) of nucleating agent | Ratio (wt %) of phase change matrix to nucleating agent |
| Example 1 | Deionized water 73.7%, sodium silicate 12.6%, dipotassium hydrogen phosphate 5.3%, aluminum sulfate 8.4% | Polyethylene glycol | 1:0.032 | Reaction monomer 90%, Macroinitiator 9%, Guide agent 1% | 1:0.021 |

TABLE 1-continued

Raw material ratios for preparing phase change gels

| Item | Raw material ratio (wt %) of phase change matrix | Temperature regulator | Ratio (wt %) of phase change matrix to temperature regulator | Raw material ratio (wt %) of nucleating agent | Ratio (wt %) of phase change matrix to nucleating agent |
|---|---|---|---|---|---|
| Example 2 | Deionized water 72.6%, Sodium silicate 11.6%, dipotassium hydrogen phosphate 7.4%, Aluminum sulfate 8.4% | Polyethylene glycol | 1:0.032 | Reaction monomer 91%, Macroinitiator 8%, Guide agent 1% | 1:0.021 |
| Example 3 | Deionized water 83.3%, Sodium silicate 6.25%, dipotassium hydrogen phosphate 4.2%, Aluminum sulfate 6.25% | Polyethylene glycol | 1:0.021 | Reaction monomer 87%, Macroinitiator 12%, Guide agent 1% | 1:0.021 |
| Example 4 | Deionized water 68.5%, Sodium silicate 14.7%, dipotassium hydrogen phosphate 6.3%, Aluminum sulfate 10.5% | Polyethylene glycol | 1:0.042 | Reaction monomer 92%, Macroinitiator 7%, Guide agent 1% | 1:0.011 |
| Example 5 | Deionized water 77.4%, Sodium silicate 11.3%, dipotassium hydrogen phosphate 4.1%, Aluminum sulfate 7%, Sodium hydroxide 0.2% | Polyethylene glycol | 1:0.021 | Reaction monomer 93%, Macroinitiator 6%, Guide agent 1% | 1:0.01 |

Comparative Examples

Cooling 50.8 kg of water to 0-5° C., then adding 21 kg $MgCl_2$, 21 kg $Ca(NO_3)_2$, 2 kg NaCl, 1 kg $Mg(OH)_2 \cdot MgCO_3$, 1.2 kg of carboxymethyl cellulose sodium (CMC), 3 kg of KCl in water in sequence, mixing and stirring for 12 h, starting to keep the temperature of the solution at −5-0° C. once $MgCl_2$ is added into the water, stirring for 3 h with uniform speed, then keeping the temperature of the solution at −15-10° C., and standing for 72 h below −20° C. once the stirring is completed to obtain the phase change gel of the Comparative Example 1.

Likewise, the phase change gel of Comparative Example 1 was subjected to a performance test. Specifically, the phase change temperature, latent heat and cycle stability of the phase change gel prepared in Comparative Example 1 are respectively tested through a step cooling curve and differential scanning calorimetry (DSC); the leakage problem was evaluated by observing whether the phase change gel of Comparative Example 1 leaked during the cycle freezing. The performance test results of the phase change gels prepared in Comparative Example 1 are shown in Table 2.

TABLE 2

Performance of phase change gels

| Item | Phase change temperature before cycle (° C.) | Latent heat of phase change before cycle (kJ/kg) | Phase change temperature after 100 cycles (° C.) | Latent heat of phase change after 100 cycles (kJ/kg) | Stability | Leakage problem |
|---|---|---|---|---|---|---|
| Example 1 | −80.0 | 260.0 | −76.0 | 242 | Good | No |
| Example 2 | −78.0 | 200.8 | −76.0 | 188 | Good | No |
| Example 3 | −77.0 | 210.0 | −73.0 | 199 | Good | No |

TABLE 2-continued

Performance of phase change gels

| | Performance effect | | | | | |
|---|---|---|---|---|---|---|
| Item | Phase change temperature before cycle (° C.) | Latent heat of phase change before cycle (kJ/kg) | Phase change temperature after 100 cycles (° C.) | Latent heat of phase change after 100 cycles (kJ/kg) | Stability | Leakage problem |
| Example 4 | −75.0 | 235.0 | −71.5 | 225 | Good | No |
| Example 5 | −70.5 | 220.0 | −68.2 | 199 | Good | No |
| Comparative Example 1 | −50.0 | 270.0 | −40.0 | 201 | General | No |

As seen from Table 2 and FIGS. 4 to 8, the phase change temperatures of the phase change gels obtained in each of the examples (Examples 1 to 5) were between −80° C. and −70° C., the latent heat of phase change was higher than 200 kJ/kg, there was no leakage phenomenon, and the cycle stability was good, specifically, the reduction rate of the phase change temperature after 100 cycles of the phase change gels of Examples 1 to 5 was not more than 5.2%, and the reduction rate of the latent heat of the phase change was not more than 9.6%.

In summary, the phase change gels obtained in each example (Examples 1 to 5) had high latent heat of phase change, good cycle stability, no leakage phenomenon, and a phase change temperature between −80° C. and −70° C. In contrast, the phase change gel obtained in Comparative Example 1 cannot simultaneously achieve the performance effects of the phase change gel obtained in each of the above examples.

Although the present disclosure has been specifically described above with reference to the accompanying drawings and examples, it is to be understood that the above description does not limit the disclosure in any way. Variations and modifications of the disclosure may occur to persons skilled in the art as may be desired without departing from the true spirit and scope of the disclosure, and such variations and modifications are intended to fall within the scope of the disclosure.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Unless indicated otherwise, not all steps listed in the various figures need be carried out in the specific order described.

The disclosure claimed is:

1. An ultra-low temperature phase change gel comprising a phase change matrix, a temperature regulator, and a nucleating agent, wherein:
the phase change matrix is a host material for phase change to store and to release cooling capacity;
the temperature regulator regulates a phase change temperature of the phase change matrix;
the nucleating agent reduces a supercooling degree of the phase change matrix;
the phase change matrix comprises a temperature control material and water;
the temperature control material comprises sodium silicate, dipotassium hydrogen phosphate, and aluminum sulfate;
the temperature regulator comprises polyethylene glycol;
the nucleating agent comprises a composite material formed by free radical polymerization of a reaction monomer and a macroinitiator;
the composite material comprises polyacrylic acid grafted with silica hybrid nano particles; and
in the ultra-low temperature phase change gel,
a mass percentage of the phase change matrix is 95% to 97%,
a mass percentage of the temperature regulator is 2% to 4%, and
a mass percentage of the nucleating agent is 1% to 2%.

2. The ultra-low temperature phase change gel of claim 1, wherein:
the polyethylene glycol has hydroxyl groups on both ends; and
in the ultra-low temperature phase change gel, hydrogen bonds are formed between the hydroxyl groups and the phase change matrix to adjust thermal performance parameters of the phase change matrix.

3. The ultra-low temperature phase change gel of claim 1, wherein the nucleating agent reduces the supercooling degree of the phase change matrix by inducing crystallization behavior of the phase change matrix.

4. The ultra-low temperature phase change gel of claim 1, wherein a particle size of the nucleating agent is 100 nm to 900 nm.

5. The ultra-low temperature phase change gel of claim 1, wherein a molar ratio of the silica to the polyacrylic acid is 1:1 to 1:4 in the polyacrylic acid grafted with silica hybrid nano particles.

6. The ultra-low temperature phase change gel of claim 1, wherein a preparation method of the nucleating agent comprises the steps of:
preparing the reaction monomer and the macroinitiator as prepared raw materials;
adding the prepared raw materials into an organic solvent to obtain a mixed solution;
adding a guide agent into the mixed solution to carry out reversible addition fragmentation chain transfer reaction to obtain a suspension; and
dropping the suspension into a precipitant for precipitation to obtain the nucleating agent;

wherein:
   the reactive monomer comprises acrylic acid; and
   the macroinitiator comprises silica-dithioester.

7. The ultra-low temperature phase change gel of claim 6, wherein, in the prepared raw material of the nucleating agent,
   a mass percentage of the reaction monomer is 87% to 93%,
   a mass percentage of the macroinitiator is 6% to 12%, and
   a mass percentage of the guide agent is 1%.

8. The ultra-low temperature phase change gel of claim 1, wherein:
   the temperature control material is a mixture of sodium silicate, dipotassium hydrogen phosphate, and aluminum sulfate; and
   in the phase change matrix,
      a mass percentage of the sodium silicate is 6.25% to 14.7%,
      a mass percentage of the dipotassium hydrogen phosphate is 4.1% to 7.4%, and
      a mass percentage of the aluminum sulfate is 6.25% to 10.5%.

9. The ultra-low temperature phase change gel of claim 1, wherein a mass percentage of the temperature control material is 16.7% to 31.5% in the phase change matrix.

10. The ultra-low temperature phase change gel of claim 1, wherein a mass percentage of water is 68.5% to 83.3% in the phase change matrix.

* * * * *